United States Patent
Tsuzura

(10) Patent No.: US 6,388,462 B1
(45) Date of Patent: May 14, 2002

(54) WAVEFORM SHAPING DIGITAL CIRCUIT

(75) Inventor: Tadayuki Tsuzura, Tokyo (JP)

(73) Assignee: Sukuld Enterprise Yuugen Kaisha, Saitama (JP)

( * ) Notice: Subject to any disclaimer, the term of this patent is extended or adjusted under 35 U.S.C. 154(b) by 0 days.

(21) Appl. No.: 09/446,290
(22) PCT Filed: Jul. 21, 1998
(86) PCT No.: PCT/JP98/02971
§ 371 Date: Dec. 21, 1999
§ 102(e) Date: Dec. 21, 1999
(87) PCT Pub. No.: WO99/01936
PCT Pub. Date: Jan. 14, 1999

(30) Foreign Application Priority Data

Jul. 4, 1997 (JP) .............................. 9-193340
Apr. 20, 1998 (JP) .......................... 10-123922

(51) Int. Cl.[7] .......................................... H31K 19/003
(52) U.S. Cl. .............................. 326/29; 326/86; 326/26; 326/27; 326/83
(58) Field of Search ............................ 326/83, 86, 27, 326/26, 29

(56) References Cited

U.S. PATENT DOCUMENTS

| | | | |
|---|---|---|---|
| 4,985,644 A | * | 1/1991 | Okihara et al. ................ 326/27 |
| 5,045,722 A | * | 9/1991 | Yang et al. .................... 326/83 |
| 5,087,834 A | * | 2/1992 | Tsay ............................. 326/33 |
| 5,717,343 A | * | 2/1998 | Kwong ......................... 326/27 |
| 5,910,730 A | * | 6/1999 | Sigal ............................ 326/24 |
| 6,031,389 A | * | 2/2000 | Fotouchi et al. .............. 326/31 |
| 6,107,833 A | * | 8/2000 | Yoshida ........................ 326/83 |

FOREIGN PATENT DOCUMENTS

JP          63-70611     * 3/1988    .................. 326/83

OTHER PUBLICATIONS

General Information for TTL IC pp. 3–4, 3–5, 3–3, 3–6, 3–7, 3–8, 3–9, 3–10, 3–11, 4–1, 4–3, 6–1, 6–5.
General Information for EMI filter, 041, Apr. 1, 1998, pp. 1–6.

* cited by examiner

Primary Examiner—Michael Tokar
Assistant Examiner—Steve S. Paik
(74) Attorney, Agent, or Firm—Jordan and Hamburg LLP

(57) ABSTRACT

A digital circuit which transmits information by a multilevel signal having at least two values. A waveform shaping section is provided to which at least first and second presumption values for defining at least first and second presumption ranges based on said at least two values, respectively, are set. The waveform shaping section performs a waveform shaping for eliminating higher harmonic components of a waveform in each of the presumption ranges and performs a waveform shaping for maintaining abrupt changes of the waveform in a transition period from one of the presumption ranges to another.

6 Claims, 10 Drawing Sheets

WAVEFORM SHAPING DIGITAL CIRCUIT

TECHNICAL FIELD

The present invention relates generally to a digital circuit for transmitting information with a binary, multilevel, signal defined by first and second values different from each other or for transmitting information with a multilevel signal defined by a plurality of predetermined values different from each other, and more particularly to a digital circuit for shaping waveform of an input and an output signal to reduce undesirable radiations.

BACKGROUND OF THE INVENTION

In a digital circuit, a signal processing and an information transmission are carried out by means, for example, of a binary signal, i.e., a first value (or a logical "1") and a second value (or a logical "0"). Taken as a common example of such a digital circuit is a TTL-IC (hereinafter referred to as "digital IC"). In general, a noise margin is set to such a binary signal processed in a digital IC so that the binary signal can be discriminated at the signal-receiving side.

A basic waveform of a binary signal processed in a common digital IC is shown in FIG. 10. As shown in FIG. 10-(a), when a value of a binary signal varies within a range between 0 and +5 volts, it is determined at the side receiving the binary signal that the signal is an input of a first value (a first presumption value) if the value of the input signal falls within a first presumption range. Similarly, it is determined that the signal is an input of the second value (a second presumption value) if the input signal falls within a second presumption range.

The first presumption range is, for example, from +2.0 volts to +5 volts and the second presumption range is from 0 volt to +0.8 volt at the input side.

At the side for outputting the binary signal, taking into consideration the noise margin, a value within a range from a minimum output value (+2.4 volts) to a maximum output value for logical "1" is outputted as an output signal in the case of the first value, and a value within a range from a maximum output value (+0.4 volt) for logical "0" to the ground level is outputted as an output signal in the case of the second value.

When an output signal is produced based on a given input signal (for example, an operation result), if the value of this input signal lies around a threshold value which does not belong to logical "1" (or a high level) nor logical "0" (or a low level), e.g., if the value is within the range from 1.2 volt to 1.4 volt in the case of TTL, high-level output means for producing a high-level output signal and low-level output means for producing a low-level output signal may simultaneously be activated. If these means are activated simultaneously, a current from the power supply, i.e., a spike current of the power supply increases, as a result of which the operation of the circuit becomes unstable. This situation can substantially be avoided by shortening the time period when the value of the input signal resides in the vicinity of the above-described threshold value. That is to say, it is desirable that the waveform of a binary signal processed in a digital IC have leading edges rising and trailing edges falling substantially vertically. If the leading and trailing edges are gentle a jitter will be caused.

In the meantime, as the waveform at the leading and trailing edges are steeper or approach the right angle, its higher harmonic components increase. Such harmonic components will cause undesirable radiations. If a signal containing such harmonic components is outputted as it is, undesirable radiations (radio waves) are emitted from a transmission path of the output signal into the space. These radiations may have adverse effects on neighbouring electronic devices. For this reason, in the conventional digital ICs when a signal is outputted its waveform is shaped to decrease the harmonic components (undesirable radiations).

The shaping performed to reduce harmonic components is, in reality, a processing to eliminate the abrupt change in waveform. Such a processing is effected on the entire waveform of the output signal. Specifically, the output signal is brought into waveform which exhibits more gentle changes, in other words, into dull waveform as a whole.

One example of such shaping of waveform is shown in FIG. 10-(b). As shown in the figure, when the waveform shaping to eliminate harmonic components has been performed, even the change between the high level and the low level where an abrupt change is desired follows a gentle curve connecting the two levels, as a result of which the time period when the waveform exhibits an abrupt change is limited to a very short period. The waveform exhibiting such a change will cause a problem that timing (an instant of change in value) of the relevant digital signal is not transmitted accurately.

Although the measures of the problem of undesirable radiations have been described above for a digital circuit in which a binary, multilevel, signal is the transmission signal, it is also known that similar problems occur in a multilevel digital circuit in which a signal processing is carried out by processing three values such as "1, 0, −1" or more values.

Therefore, the present invention has been made in view of the above problems and has its object to provide a digital circuit which can accurately transmit timing of change in value of a digital signal or an instant of change in signal value and can reduce higher harmonic components (undesirable radiation components) or a magnitude of high frequency components (a magnitude of undesirable radiations).

DISCLOSURE OF THE INVENTION

A digital circuit according to the present invention comprises a waveform shaping section to which first and second presumption values for defining first and second presumption ranges in which it is deemed as a value of the binary, multilevel, values or more than two presumption values for defining more than two presumption ranges in which it is deemed as a value of the multilevel values are set, the waveform shaping section performing a waveform shaping for eliminating higher harmonic components of a waveform or reducing a magnitude of the higher harmonic components in each of the presumption ranges, and maintaining abrupt changes of the waveform in a transition period from one of the presumption ranges to another.

With this digital circuit, a waveform from which harmonic components have been eliminated or in which a magnitude of harmonic components has been reduced is generated in the presumption ranges for discriminating the first and second values or for discriminating the multilevel values, whereas a steep state of the waveform is maintained in other ranges during the time period when a transition is made from one presumption range for the presumption of one predetermined value to another presumption range for the presumption of another desired predetermined value.

As a result, changing instants of a digital signal are accurately transferred in the transmission and reception of the signal, and the undesirable radiations can be reduced.

In another digital circuit according to the present invention, the waveform shaping section comprises a comparing section for comparing a value of an input signal with presumption values defining the first and second presumption ranges or with presumption values defining the presumption ranges for the multilevel values, and a time constant section for changing a time constant defining a changing rate of the waveform of the input signal when it is detected based on a comparison result of the comparing section that the value of the input signal is within any one of the presumption ranges.

A further digital circuit according to the present invention comprises an electromagnetic interference (EMI) elimination filter for passing the input signal therethrough and a switch for causing the input signal to be supplied to the electromagnetic interference elimination filter in accordance with a comparison result of the comparing section.

In a further digital circuit according to the present invention, the waveform shaping section shapes the waveform by means of a zener diode and a resistor which are serially connected for passing the input signal therethrough.

In a further digital circuit according to the present invention, the waveform shaping section comprises two zener diodes and a resistor for passing the input signal therethrough, and shapes the waveform by means of the two zener diodes arranged in a reversed relation to each other.

In a further digital circuit according to the present invention, the comparing section outputs such a comparison result that values of the input signal are integrated into the predetermined binary values or multilevel values.

In a further digital circuit according to the present invention, the time constant section sets a waveform changing rate of an output signal to a value in the range of 5 to 50% of a pulse width when a value of the input signal exceeds a predetermined reference value which defines the presumption range.

In a further digital circuit according to the present invention, the waveform shaping section is arranged in an input stage. In a further digital circuit according to the present invention, the waveform shaping section is arranged in an output stage. In a further digital circuit according to the present invention, the waveform shaping section is arranged in input and output stages.

In a further digital circuit according to the present invention, the waveform shaping section is constructed so as to be mountable on a circuit for transmitting information by means of the binary or the multilevel signal.

As a result of the above constructions, changing instants of a digital signal is accurately transferred in the transmission and reception of the signal and the undesirable radiations can be reduced.

BEST MODE FOR CARRYING OUT THE INVENTION

The present invention will now be described in more detail with reference to the accompanying drawings.

Figure 1:
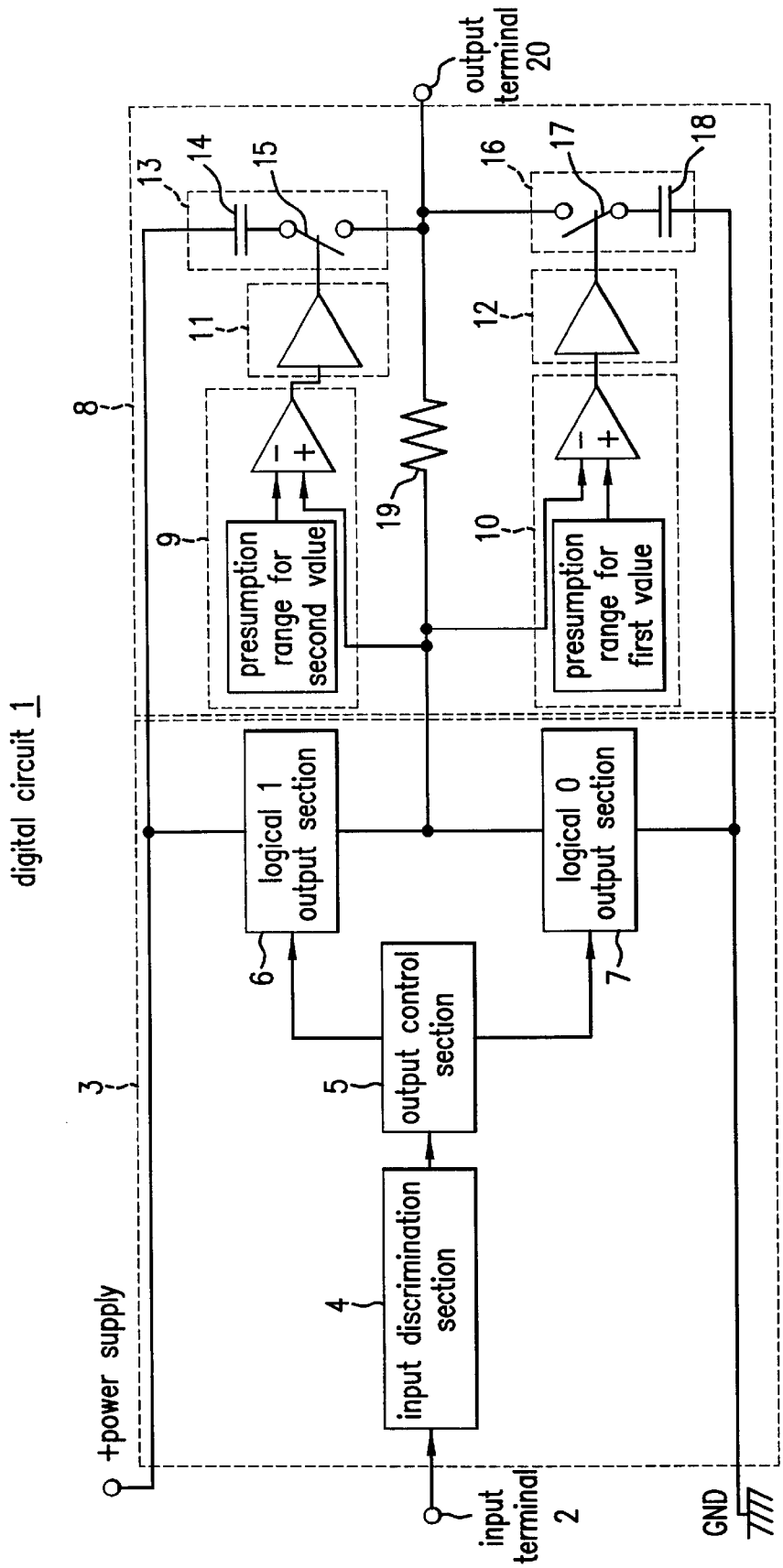
FIG. 1 is a block diagram of a first preferred embodiment of the present invention.

FIG. 1 is a block diagram showing a digital circuit according to a first embodiment of the present invention. In the figure, the digital circuit 1 comprises a logic circuit section 3 and a waveform shaping section 8.

Herein, description will be given on an example in which the logic circuit section 3 and the waveform shaping section 8 are integrated into one unit to construct the digital circuit 1. However, similar description applies to the case where only the waveform shaping section 8 is constructed as the digital circuit, provided as an external component, for the countermeasure against undesirable radiations (undesirable radiation countermeasure circuit).

The logic circuit section 3 is a known circuit for determining and generating a value (or level) of an output signal and is a logic circuit comprising inverter elements or the like for example. This logic circuit section 3 can be realized not only with a logic circuit but also with software. The logic circuit section 3 comprises an input discrimination section 4, an output control section 5, a logical "1" output section (high-level output section) 6 and a logical "0" output section (low-level output section) 7.

The input discrimination section 4 is a discrimination circuit for discriminating values (or levels) of an input signal received at an input terminal 2. The output control section 5 is operation means for controlling activation of the succeeding output sections 6 and 7 in accordance with discrimination results at the input discrimination section 4. The high-level output section 6 is a circuit for generating a logical value "1". The low-level output section 7 is a circuit for generating a logical value "0". The logical values (waveform) fed from. the output sections 6 and 7 are shaped by the succeeding waveform shaping section 8 and thereafter outputted from an output terminal 20.

The waveform shaping section 8 comprises comparing sections 9 and 10, a resistor 19, control sections 11 and 12, and time-constant sections 13 and 16. The comparing section 9 comprises a comparator for comparing an input signal with a second reference value to determine whether the output of the logic circuit section 3 (the above input signal) has a value within the aforesaid second presumption range.

The comparing section 10 comprises a comparator for comparing the input signal with a first reference value to determine whether the output of the logic circuit section 3 (the above input signal) has a value within the aforesaid first presumption range. The control sections 11 and 12 are circuits for controlling ON/OFF states of switches in accordance with outputs from the comparing sections 9 and 10, respectively. The time-constant section 13 is a circuit which has a capacitor 14 connected to a positive power supply voltage terminal and a switch 15 controlled by the control section 11. Similarly, the time-constant section 16 has a switch 17 controlled by the control section 12 and a capacitor 18 connected to the ground potential point. The resistor 19 is an element shared by the time-constant sections 13 and 16 and contributes to the adjustment of the rate of change of waveform (time-constant for the signal) by the time-constant sections 13 and 16. The switches 15 and 17 are semiconductor switches comprised for example of gate circuits. The time-constant sections 13 and 16 can each be realized by an element capable of controlling a time constant for a signal, for example, apart from a capacitor, a variable capacitor, a resistor, a coil and other semiconductor element such as a transistor, and are circuits for controlling the shaping of waveform, i.e., the rate of change of waveform (or the time constant) of a signal outputted from the output terminal 20. Each of the time-constant sections 13 and 16 may be constituted by any one of capacitor, a resistor, a coil and a semiconductor element, if it is an element capable of controlling a time constant for a signal, or by any combination of these elements, and is a circuit for realizing a predetermined time constant and a switching function. In the case where the above time constant can be set by means of an output resistance of the logic circuit section 3, the resistor 19 can be dispensed with.

Figure 2:
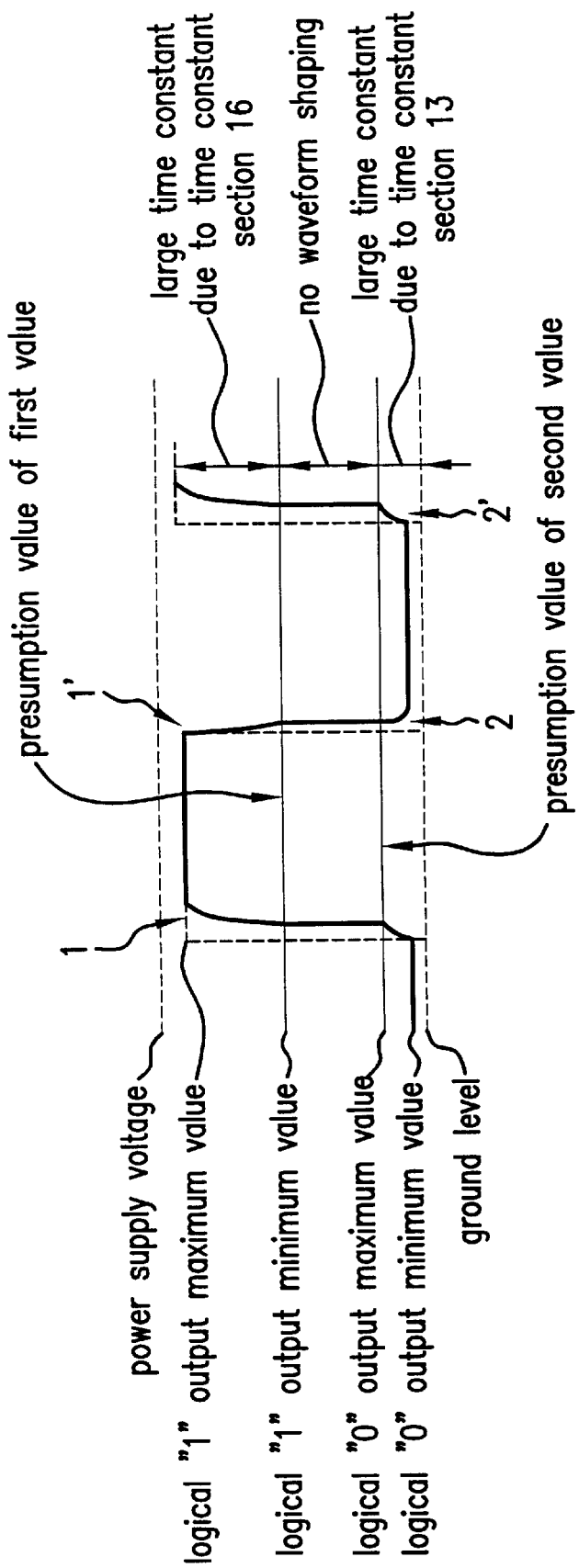
FIG. 2 is an illustration for explaining the operation of the first preferred embodiment of the present invention.

The operation of the digital circuit 1 of FIG. 1 according to the present invention will now be described with reference to FIG. 2. FIG. 2 is an illustration for explaining the operation of the first preferred embodiment of the present invention. The level of the input signal received at the input terminal 2 is determined at the input discrimination section 4. The output control section 5 effects a logical operation as determined by the discrimination result at the input discrimination section 4 to activate the high-level output section 6 when the result represents a high level and activate the low-level output section 7 when the result represents a low level. When the high-level output section 6 is activated a logical "1" signal (a square wave) is inputted to the waveform shaping section 8. Similarly, when the low-level output section 7 is activated, a logical "0" signal (a square wave) is inputted to the waveform shaping section 8.

Now, attention is paid to the case where the square wave fed from the logic circuit section 3 changes from the logical "0" to the logical "1", i.e., from the low level to the high level. The comparing section 10 always compares the input signal with the reference value. Thus, it is detected at the comparing section 10 that the input signal is greater than the high-level output minimum value, and the comparing section 10 renders its output valid. Upon receiving a comparison result representing the valid state, the control section 12 outputs a signal for activating the time-constant section 16, i.e., an enabling signal.

When activated under the control of the control section 12, the time-constant section 16 renders the switch 17 closed (ON). By this closure of the switch 17, the output terminal 20 is coupled to the ground terminal through the capacitor 18 whereupon, due to the interaction of the capacitor 18 with the resistor 19, more specifically due to the charging operation to the capacitor 18, the value (level) of the output signal from the output terminal 20 changes in accordance with a predetermined time constant.

As shown at ① in FIG. 2, the change is made gently from the logical "1" output minimum value to the logical "1" output maximum value in accordance with the predetermined time constant. The gentle change means that the corner in the vicinity of the high-level maximum value is rounded. The waveform assuming such a gentle change has reduced higher harmonic components and as a result reduced undesirable radiations.

Next, attention is paid to the case where a signal in a trailing edge waveform, i.e., a square wave changing from the high level to the low level is fed from the logic circuit section 3. The comparator in the comparing section 10 compares the input signal with the reference value and keeps the switch 17 closed during the time period when the input signal is greater than the logical "1" output minimum value, that is to say, when it falls within the first presumption range. As a result, the capacitor 18 starts discharging. Thus, an output signal whose waveform changes gently in accordance with the predetermined time constant is fed from the output terminal 20 (see FIG. 2, ①').

When the value of the input signal drops further, it is detected at the comparing section 10 that the value of the input signal is lower than the logical "1" output minimum value. As a result, the output of the comparing section 10 is set to an invalid state. In response to this output of the comparing section 10, the control section 12 outputs a disabling signal.

The time-constant section 16 renders the switch 17 open (OFF) in response to the disabling signal outputted by the control section 12. Consequently, the capacitor 18 is disconnected from between the output terminal 20 and the ground level point, so that the effect of the time-constant section 16 on the output signal at the output terminal 20 disappears. As a result, this output signal exhibits an abrupt change in accordance with the change of the input signal.

In the meantime, the comparator in the comparing section 9 always effects a comparison of the input signal with the reference value. Therefore, when the input signal further drops, the comparator in the comparing section 9 detects the fact that the input signal reaches the logic "0" output maximum value, i.e., the second presumption range. As a result, the output of the comparing section 9 is set to a valid state. In response to this output of the comparing section 9, the control section 11 outputs an enabling signal to the time constant section 13.

The time constant section 13 renders the switch 15 closed (ON) in response to the enabling signal outputted by the control section 11. By the closure of the switch 15, the output terminal 20 is coupled to the (positive voltage) power supply terminal through the capacitor 14, so that due to the interaction of the capacitor 14 with the resistor 19, i.e., more particularly due to the charging operation of the capacitor 14, the value (or level) of the output signal supplied from the output terminal 20 changes in accordance with a predetermined time constant.

More specifically, as shown at ② in FIG. 2 the value changes gently from the logical "0" output maximum value to the logical "0" output minimum value in accordance with the predetermined time constant. The gentle change means that the corner in the vicinity of the logical "0" output maximum value is rounded. The waveform assuming such a gentle change has reduced higher harmonic components and as a result reduced undesirable radiations.

Furthermore, attention is paid to the case where a signal in a leading edge waveform, i.e., a square wave changing from the low level to the high level is outputted from the logic circuit section 3. In this case, it is detected in the comparing section 9 that the input signal has a value less than the low-level output maximum value and the output thereof is set to a valid state. That is to say, the control section 11 keeps outputting the enabling signal. As a result, the capacitor 13 starts discharging, so that the output signal from the output terminal 20 changes gently.

More specifically, as shown at ②' in FIG. 2 the output signal changes gently from the logical "0" output minimum value to the logical "0" output maximum value in accordance with the predetermined time constant. The gentle change means that the corner in the vicinity of the logical "0" output minimum value is rounded. The waveform assuming such a gentle change has reduced higher harmonic components and as a result reduced undesirable radiations.

When the value of the input signal rises further and exceeds the logical "0" output maximum value, the comparing section 9 sets its output signal to an invalidated state. In response to this output, the control section 11 outputs a disabling signal to the time constant section 13.

The time-constant section 13 renders the switch 15 open (OFF) in response to the disabling signal. Consequently, the capacitor 14 is disconnected from between the output terminal 20 and the power supply terminal, so that the effect of the time-constant section 13 on the output signal at the output terminal 20 disappears. As a result, this output signal exhibits an abrupt change in accordance with the change of the input signal.

In the case of a digital signal in which the high level and the low level, i.e., the logical "1" and the logical "0", are repeated alternately, when the switch 15, 17 is open, the capacitor 14, 18 of the time constant section 13, 16 holds the status (or stores the charge) immediately after the relevant switch was open, thus maintaining a voltage equivalent to that present when the switch had been open. Thus, even when the time constant section 13, 16 repeats starts and stops with the capacitor maintaining the charge stored, switching noises by the switch 15, 17 may be at such a level that no problems will be caused in the operation.

As described above, in the first embodiment of the present invention the waveform of the signal is dulled in the first and second presumption ranges and the steep waveform is maintained in ranges other than these presumption ranges. As a result, when a digital signal is transmitted, changing instants of the signal can be transmitted accurately, and the harmonic components and thus the undesirable radiations can be reduced. When the comparing sections can directly drive the time constant sections (or the switches), the control sections may be dispensed with.

Figure 3:
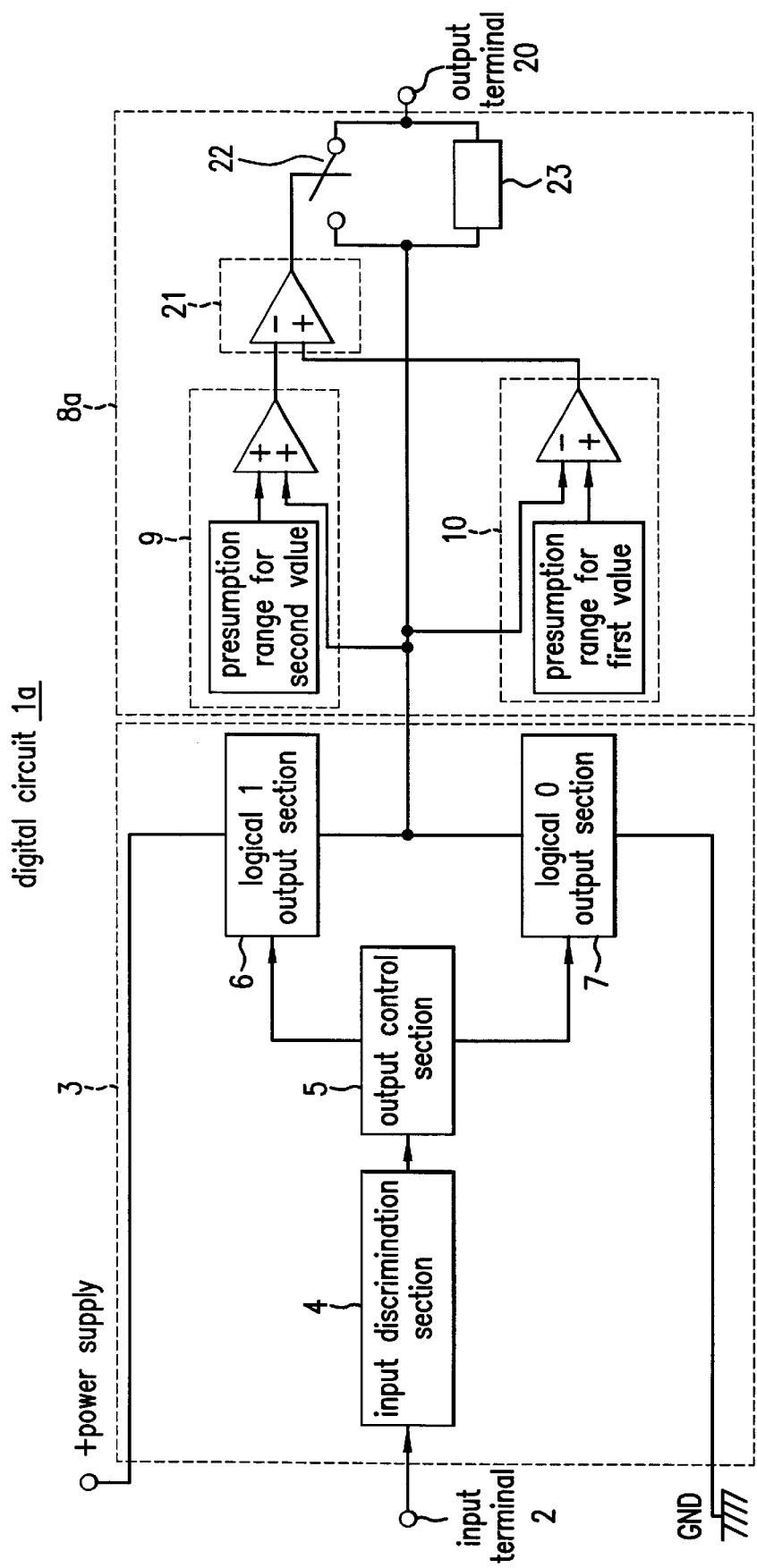
FIG. 3 is a block diagram of a second preferred embodiment of the present invention.
Figure 4:
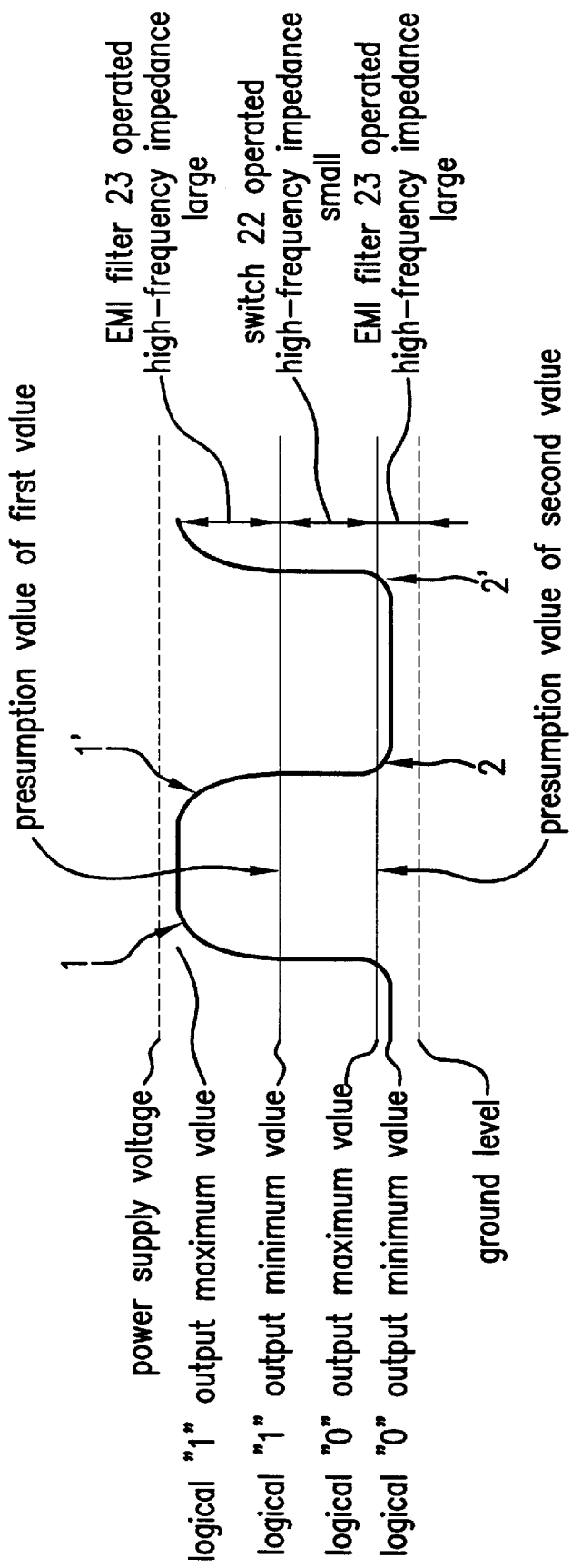
FIG. 4 is an illustration for explaining the operation of the third preferred embodiment of the present invention.

Next, a digital circuit according to a second embodiment of the present invention will be described with reference to FIGS. 3 and 4. FIG. 3 is a block diagram of the digital circuit according to the second embodiment of the present invention. In the figure, the portions identical to those in FIG. 1 are designated by the same reference numerals and their description will be omitted. FIG. 4 is an illustration for explaining the operation of the second preferred embodiment of the present invention.

The digital circuit 1a shown in FIG. 3 is different in the structure of a waveform shaping section 8a as compared to the digital circuit 1 of FIG. 1. The waveform shaping section 8a comprises comparing sections 9 and 10, a control section 21, a switch 22 and an EMI filter 23.

The control section 21 is a circuit for controlling ON/OFF states of the switch 22 in accordance with outputs from the comparing sections 9 and 10. At an output of the control section 21, a logical sum of inputs to the control section 21 is outputted. The switch 22 is an element comprised for example of a semiconductor switch, as the switch described above with reference to FIG. 1. The EMI filter 23 is an element comprised of a known filter or the like for attenuating harmonic components.

The process in which a signal is received at the input terminal 2 and a signal is outputted from the logic circuit section 3 is the same as that in the first embodiment described above with reference to FIGS. 1 and 2. Herein, only the operation of the waveform shaping section 8a in response to an output signal of the logic circuit section 3 will be described.

First, attention is paid to the case where a square pulse signal fed from the logic circuit section 3 changes from the logical "0" to the logical "1", i.e., from the low level to the high level. The comparing section 10 always compares the input signal with the reference value. Thus, it is detected at the comparing section 10 that the input signal is greater than the logical "1" output minimum value and the comparing section 10 renders its output valid. In response to this output, the control section 21 outputs a disabling signal to the switch 22.

When the disabling signal is fed from the control section 21, the switch 22 is rendered open (OFF). More specifically, the input signal received by the waveform shaping section 8a is supplied via the EMI filter 23 to the output terminal 20.

As shown at ① in FIG. 4, from the time when the signal outputted by the logic circuit section 3 exceeds the logical "1" output minimum value to the time when it reaches the logical "1" output maximum value, the change in waveform of the output signal fed from the output terminal 20 is gentle due to the effect of the EMI filter 23. Thus, the higher harmonic components are reduced or eliminated from the signal and consequently the undesirable radiations are reduced.

Next, attention will be paid to the case where the signal fed from the logic circuit section 3 changes from the logical "1" to the logical "0". In this case, the switch 22 is also kept opened, so that after the square pulse signal starts falling, i.e., during the time when the value of the signal changes from the logical "1" output maximum value to the logical "1" output minimum value, the waveform appearing at the output terminal 20 changes gently (see ① of FIG. 4).

On the other hand, when it is detected as a result of the comparison of the input signal with the reference signal that the input signal has a value smaller than the logical "1" output minimum value, the comparing section 10 renders its output valid. In response to this output, the control section 21 outputs an enabling signal to the switch 22.

When the enabling signal is fed from the control section 21, the switch 22 is rendered closed (ON). More specifically, the input signal received by the waveform shaping section 8a is supplied through the switch 22 to the output terminal 20. As a result, as far as the signal does not reach the second presumption range, an output signal whose signal change is kept steep is outputted from the output terminal 20.

Next, when the input signal falls within the second presumption range, the comparing section 9 renders its output invalid. In response to this output, the control section 21 sends a disabling signal to the switch 22.

When the disabling signal is fed from the control section 21, the switch is rendered open (OFF). More specifically, the input signal received by the waveform shaping section 8a is supplied through the EMI filter 23 to the output terminal 20.

As shown at ② in FIG. 4, since the input signal passes through the EMI filter 23 from the time when its value passes the logical "0" output maximum value to the time when it reaches the logical "0" output minimum value, the waveform outputted from the output terminal changes gently. Thus, the harmonic components are reduced or removed from the signal and as a result the undesirable radiations are reduced.

Next, attention will be paid to the case where the signal fed from the logic circuit section 3 changes from the logical "0" to the logical "1". In this case, after the square pulse wave starts rising, i.e., during the time when its value changes from the logical "0" output minimum value to the logical "0" maximum value, the change in waveform of the output signal fed from the output terminal 20 is gentle (see ②' of FIG. 4).

As described above, in the second embodiment of the present invention the waveform of the signal is dulled in the first and second presumption ranges and the steep waveform is maintained in ranges other than these presumption ranges. As a result, when a digital signal is transmitted, changing instants of the signal can be transmitted accurately, and the harmonic components and thus the undesirable radiations can be reduced.

Figure 5:
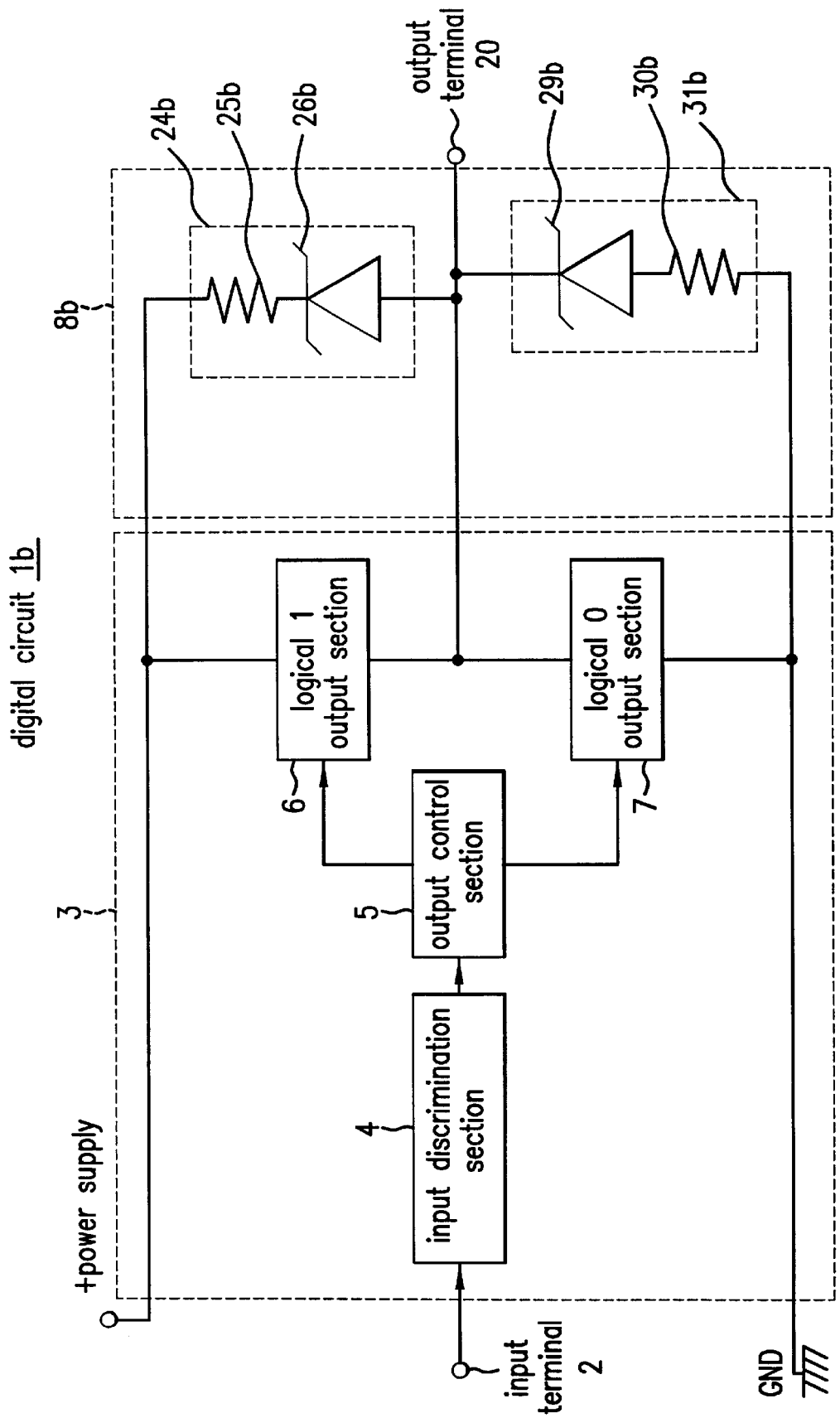
FIG. 5 is a block diagram of a third preferred embodiment of the present invention.

Next, a digital circuit according to a third embodiment of the present invention will be described with reference to FIGS. 5 and 6. FIG. 5 is a block diagram of the digital circuit according to the third embodiment of the present invention. In the figure, the portions identical to those in FIG. 1 are designated by the same reference numerals and their description will be omitted.

The digital circuit $1b$ shown in FIG. 5 is different in the structure of a waveform shaping section $8b$ as compared to the digital circuit 1 of FIG. 1. The waveform shaping section $8b$ comprises a resistor $25b$ and a zener diode $26b$ serially connected between the positive power supply terminal and the output terminal 20. Similarly, the waveform shaping section comprises a zener diode $29b$ and a resistor $30b$ serially connected between the output terminal 20 and the ground terminal.

The zener diode $26b$ is an element having such characteristic that a reverse current flows therethrough when the value of the input signal to the waveform shaping section $8b$ is smaller than the logical "0" output maximum value. A zener voltage of this zener diode $26b$ is 4.6 volts.

Similarly, the zener diode $29b$ is an element having such characteristic that a reverse current flows therethrough when the value of the input signal to the waveform shaping section $8b$ exceeds the logical "1" output minimum value. A zener voltage of this zener diode $29b$ is 2.4 volts.

Now, attention is paid to the case where a square pulse signal changing from the logical "0" to the logical "1" is received from the logic circuit section 3. When the value of this signal does not reach the presumption range for the first value, the zener diode $29b$ maintains a high resistance due to a reverse voltage applied thereto. As a result, little current flows through the zener diode $29b$, so that the signal at the output terminal 20 is hardly affected. However, when the value of the input signal from the logic circuit section 3 goes in the first presumption range, the zener diode $29b$ by its zener effect causes a current to start flowing toward the ground terminal.

Figure 6:
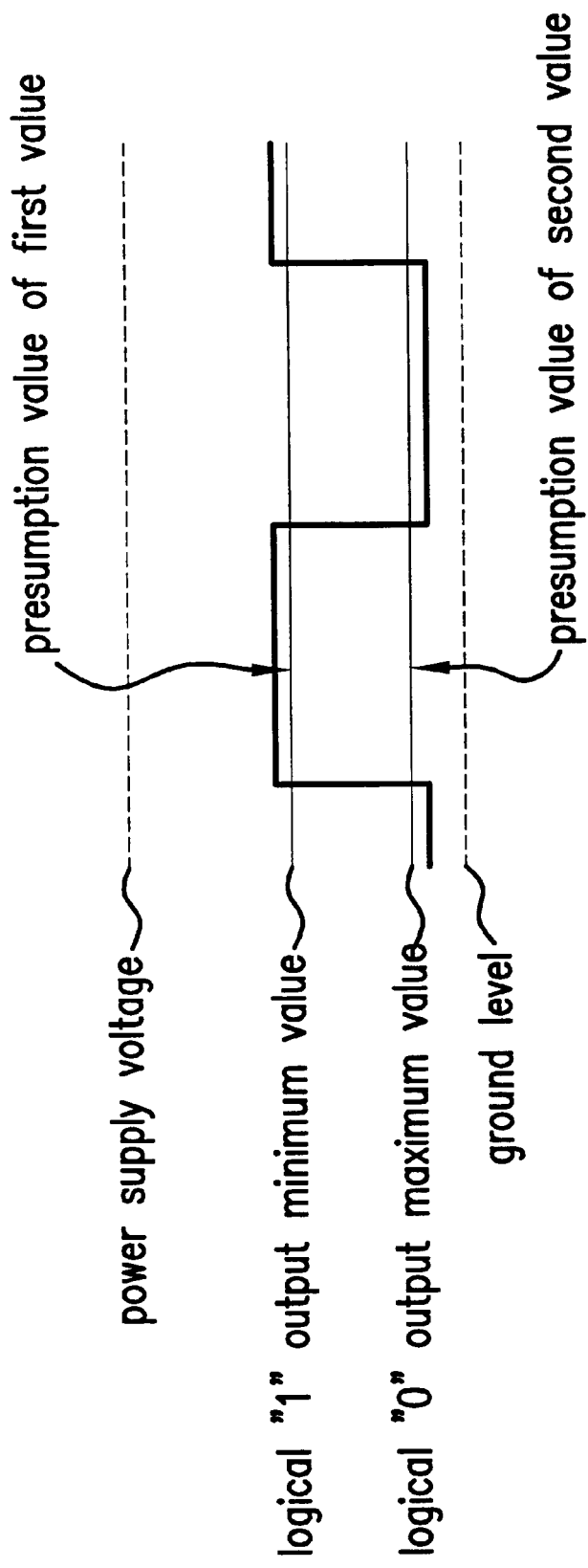
FIG. 6 is an illustration for explaining the operation of the third preferred embodiment of the present invention.

As shown in FIG. 6, the output signal at the output terminal 20 does not go up, due to its zener effect, from a level which slightly exceeds the logic "1" output minimum value and substantially maintains the zener voltage. That is to say, a voltage of 2.4 volts is maintained between the output terminal 20 and the ground terminal. Thus, the magnitude (or level) of harmonic components of the output signal is reduced, and consequently the magnitude (or level) of the undesirable radiations is reduced. For example, when it is assumed that the logical "1" output maximum value is 4 volts, the reduction is as follows:

20 log(logical "1" output maximum value/logical "1" output minimum value)=20 log(4/2.4)=4.4 dB The magnitude (or level) of the harmonic components is reduced in accordance with the reduction in amplitude of 4.4 dB and the magnitude (or level) of the undesirable radiations is reduced accordingly.

Next, attention is paid to the case where the waveform shaping section $8b$ receives from the logic circuit section 3 a signal which changes from the logical "1" to the logical "0".

Before the value of the input signal goes out of the first presumption range, the current flowing through the zener diode $29b$ decreases, so that the zener diode is brought into a high-resistance state and thus the effect on the signal at the output terminal 20 decreases. Consequently, the abrupt change of the signal is maintained in the transition period from the first presumption value to the second presumption value.

Next, attention will be paid to the case where the input signal represents a value within the second presumption range. As shown in FIG. 6, the input signal does not drop, due to its zener effect, from a level which slightly exceeds the logic "0" output maximum value, and substantially maintains the zener voltage value. That is to say, a voltage of 4.6 volts is maintained between the positive power supply and the output terminal 20. When converting this voltage to a voltage between the output terminal 20 and the ground terminal, 0.4 volt is maintained therebetween.

Thus, the magnitude (or level) of harmonic components of the output signal is reduced, and consequently the magnitude (or level) of the undesirable radiations is reduced. For example, when it is assumed that the logical "0" output minimum value is 0.2 volt, the logical "0" output maximum value and the logical "0" output minimum value can be converted into amplitude values relative to the power supply voltage as a reference as follows:

5 volts (power supply voltage)–0.4 volt (logical "0" output maximum voltage)=4.6 volts;

and 5 volts (power supply voltage)–0.2 volt (logical "0" output minimum voltage)=4.8 volts.

Therefore, the reduction in amplitude is:

20 log(4.8/4.6)=0.3697 dB

Thus, the magnitude (or level) of the harmonic components is reduced in accordance with the above reduction of the amplitude by 0.3697 dB, and the magnitude (or level) of the undesirable radiations is reduced accordingly.

Next, attention is paid to the case where the input signal again changes from the logical "0" to the logical "1". When the signal is below the logical "0" output maximum value, i.e., within the second presumption range, the zener diode $26b$ stays in the operating condition and thus maintains substantially the zener voltage. Specifically, a voltage of 0.4 volt is maintained between the output terminal 20 and the ground terminal.

Before the input signal goes out of the presumption range for the second value, the zener diode $26b$ is brought into a high-resistance state in which no current flows. More specifically, little current flows through the zener diode $26b$, as a result of which the effect on the output signal at the output terminal 20 is weakened, so that the abrupt change of the signal is maintained in the transition period from the presumption value for the second value to the presumption value for the first value.

As described above, in the region other than those for the waveform shaping (from the logical "0" output maximum value to below the logical "1" output minimum value), i.e., within the transition period from the first value to the second value, the waveform can be kept steep. Thus, instants of change of signal can accurately be transmitted during the transmission and reception of the digital signal and in addition the magnitude (or level) of the undesirable radiations can be reduced.

The resistors 25b and 30b are resistors for limiting currents and can therefore be omitted if the rated current of the zener diodes is large enough.

Figure 7:
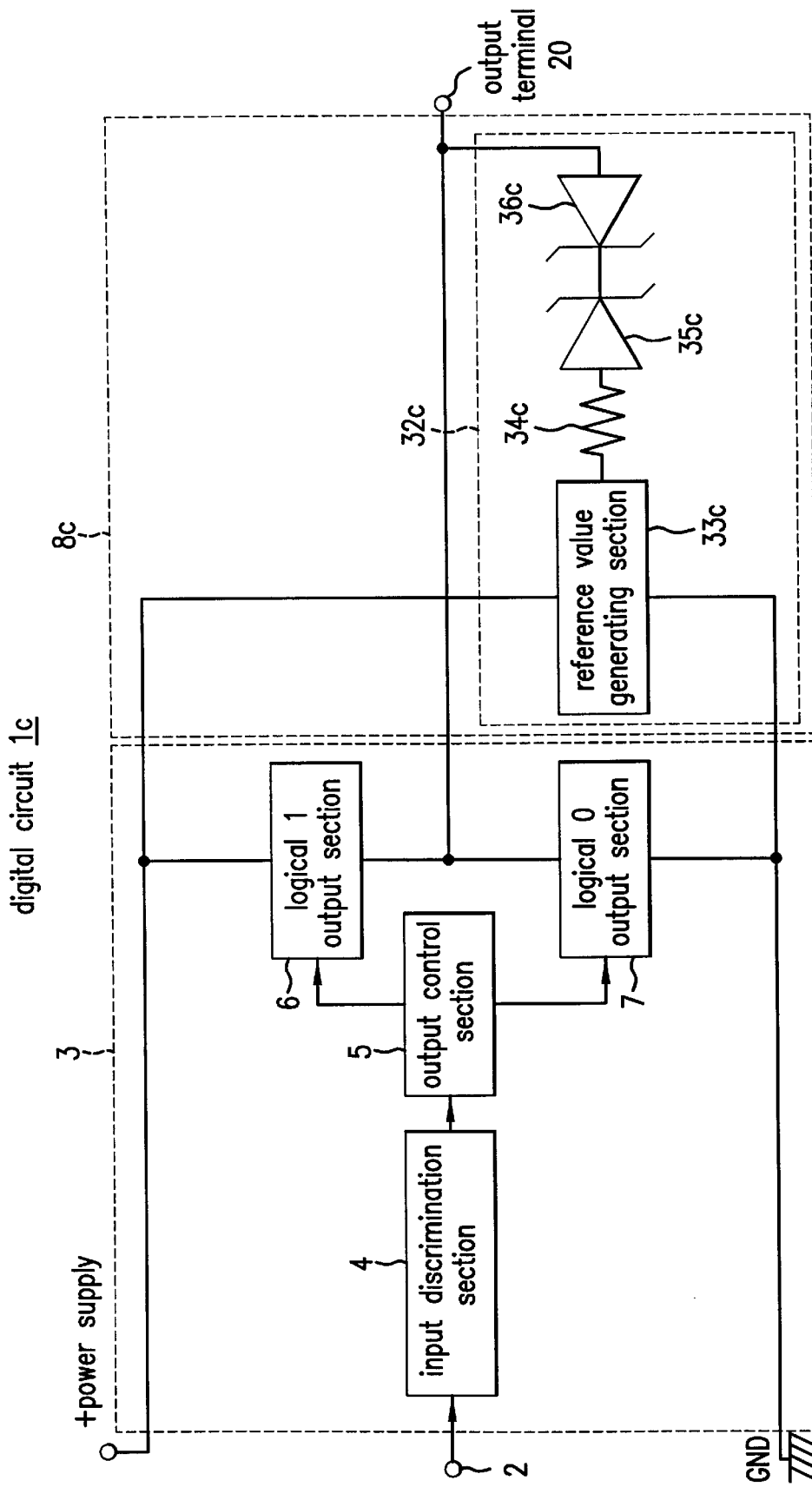
FIG. 7 is a block diagram of a fourth preferred embodiment of the present invention.

Next, a fourth preferred embodiment of the present invention will be described with reference to FIG. 7. FIG. 7 is a block diagram of the fourth embodiment of the present invention. In the figure, the portions identical to those in FIG. 1 are designated by the same reference numerals and their duplicated description will be omitted.

A waveform shaping section 8c comprises a reference voltage generating section 33c provided between the positive power supply and the ground terminal for generating a voltage of 1.4 volt which is a center value between the logical "0" output maximum value and the logical "1" output minimum value. A resistor 34c and zener diodes 35c and 36c are serially connected between an output terminal of this reference voltage generating section 33c and the output terminal 20. The zener diodes 35c and 36c are connected in a back-to-back fashion. The zener voltage of the zener diode 35c, 36c is set to a value which is one-half (1 volt) of the difference (2.4–0.4) between the first value and the second value, or a value obtained by subtracting about 0.7 volt from that value.

Now, attention is paid to the case where the input signal fed to the waveform shaping section 8c changes from the logical "0" to the logical "1". When the value of the input signal is below the presumption range for the first value, the zener diode 35c exhibits a high resistance, as a result of which little current flows, so that there is little effect on the output at the output terminal 20. Thus, the waveform of the input signal is reflected on the output signal as it is. On the other hand, when the value of the signal fed to the waveform shaping section 8c exceeds the presumption value for the first value, it does not go up further due to the zener effect of the zener diode 35c.

As shown in FIG. 6, the signal does not go up from a level which slightly exceeds the logic "1" output minimum value. Thus, the magnitude (or level) of harmonic components of the output signal is reduced, and consequently the magnitude (or level) of the undesirable radiations is reduced.

As long as the signal is equal to or greater than the logical "1" output minimum value, i.e., within the presumption range for the first value, the zener diode 35c continues to operate.

Next, attention is paid to the case where the value of the input signal changes from the logical "1" to the logical "0".

When the value of the signal fed to the waveform shaping section 8c represents a value below the presumption range for the first value, the zener diode 35c assumes a high resistance. As a result, little current flows, so that the effect on the signal supplied from the output terminal 20 disappears. Specifically, the abrupt change of the waveform is maintained when a transition is made from the presumption value of the first value to the presumption value of the second value.

As regards the presumption range for the second value, when the value of the signal fed to the waveform shaping section 8c is out of the presumption range for the second value, the zener diode 36c has a high resistance, so that little current flows therethrough. As a result, there is little effect on the signal supplied from the output terminal 20. On the other hand, when the value of the signal fed to the waveform shaping section 8c falls within the presumption range for the second value, it does not drop further from around the presumption value of the second value due to the zener effect of the zener diode 36c.

As shown in FIG. 6, the signal does not drop from a level slightly exceeded the logical "0" output maximum value. Thus, the magnitude (or level) of the harmonic components of the signal outputted from the output terminal 20 is reduced, i.e., the magnitude (or level) of the undesirable radiations is reduced. As long as the signal is equal to or lower than the logical "0" output maximum value, i.e., it stays within the presumption range for the second value, the zener diode 36c continues to operate.

Next, attention will be paid to the case where the input signal changes from the logical "0" to the logical "1".

When the value of the input signal takes a value out of the presumption range for the second value, the zener diode 36c assumes a high resistance, so that little current flows therethrough. As a result, the signal outputted from the output terminal 20 is little affected. Specifically, the abrupt change of the signal is maintained in the transition period from the presumption value of the second value to the presumption value of the first value.

As described above, during the period when no waveform shaping is performed (the logical "1" output maximum value—below the logical "1" output minimum value), i.e., when a transition is made from the first value to the second value, the waveform is kept steep. As a result, instants of change in signal can accurately be transmitted in a transmission and a reception of the digital signal and in addition the magnitude (or level) of the undesirable radiations can be reduced.

In the case where the rated current of the zener diodes is sufficiently large, the resistor 34c can be dispensed with.

So far, the description has been made, by way of example, on a binary digital signal processed in a common digital circuit such as a TTL-IC. However, the present invention can also be applied to a multilevel digital signal. Hereinafter, an embodiment of the present invention in which a three-valued digital signal is processed will be described.

Figure 8:
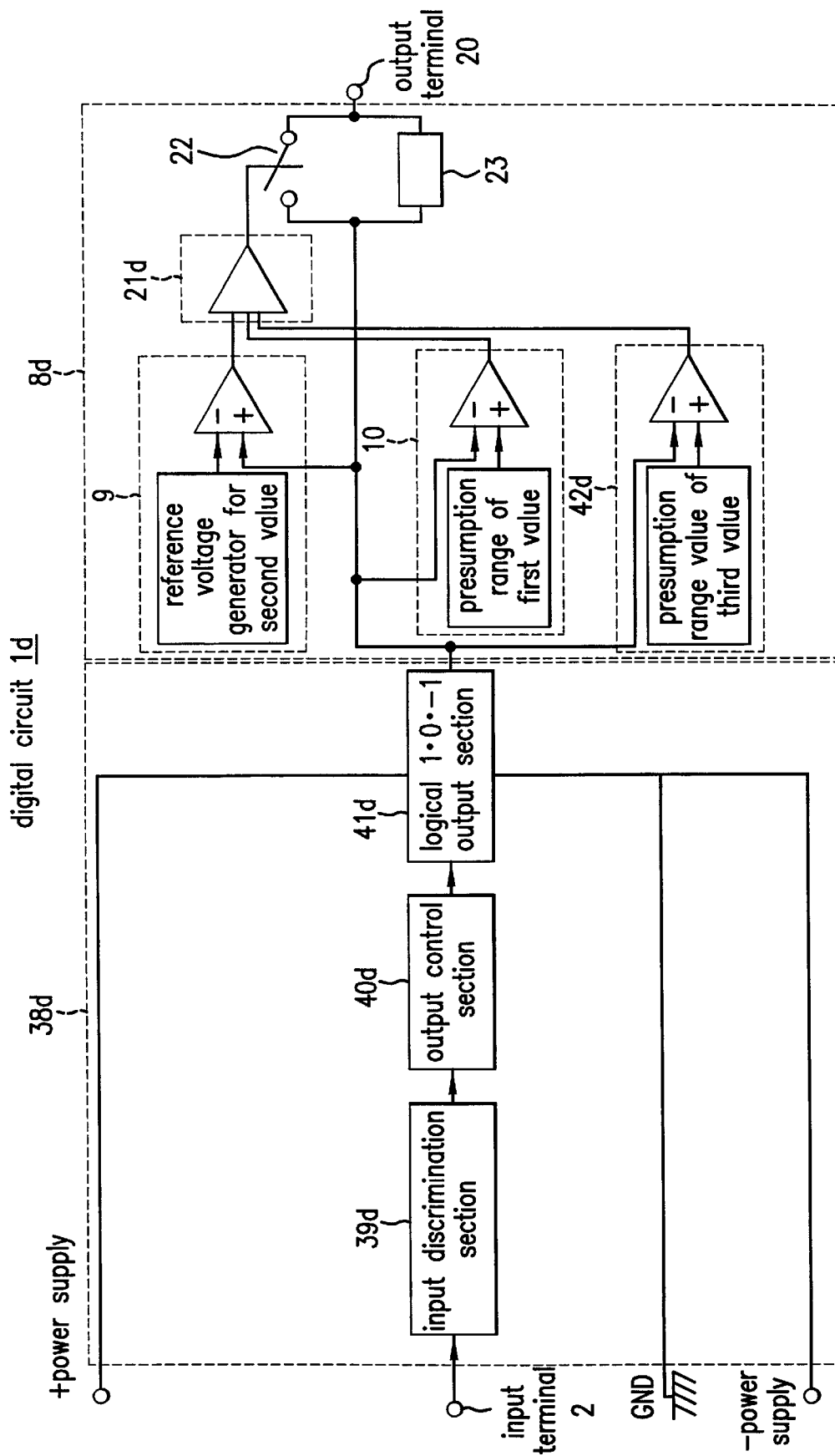
FIG. 8 is a block diagram of a fifth preferred embodiment of the present invention.

FIG. 8 is a block diagram of a fifth preferred embodiment of the present invention. In the figure, the portions identical to those of FIGS. 1 and 3 are designated by the same reference numerals and their duplicating description will be omitted. A digital circuit 1d shown in the figure comprises a logic circuit section 38d and a waveform shaping section 8d. The logic circuit section 38d comprises an input discrimination section 39d, an output control section 40d and a logical output section 41d. The logical output section 41d is a circuit for outputting a logical "1", "0" or "−1" under the control of the output control section 40d. The input discrimination section 39d and the output control section 40d are different from those shown in FIG. 1 in that these sections operate also in response to the logical "−1".

The waveform shaping section 8d is constituted by comparing sections 9, 10 and 42d for receiving an output of the logical output section 41d in the logic circuit section 38d, a control section 21d for receiving comparison results of these comparing sections, a switch 22 controlled by the control section 21d, and an EMI filter section 23 connected in parallel to the switch 22 for attenuating harmonic components.

The comparing section 9 is a circuit for comparing the input signal with a reference value defining the second presumption value to output the comparison result to the control section 21d. The comparing section 10 is a circuit for comparing the input signal with a reference value defining the first presumption value to output the comparison result to the control section 21d. The comparing section 42d is a circuit for comparing the input signal with a reference value defining the third presumption value to output the comparison result to the control section 21d. The control section 21d is a circuit for driving the switch 22 in accordance with the comparison results at the comparing sections 9, 10 and 42d. The switch 22 and the EMI filter 23 are elements identical to those shown in FIG. 3.

A signal received at the input terminal 2 is discriminated at the input discriminating section 39d, whereupon a predetermined output state is selected at the output control section 40d. Then, a logical "1", a logical "0" or a logical "−1" is selectively outputted from the logical output section 41d.

Now, attention is paid to the case where the input signal to the waveform shaping section 8d changes from the logical "0" to the logical "1". When it is detected by comparing the input signal with the reference value that this signal reaches the presumption range for the first value, the comparing section 10 renders its output valid.

In response to the output of the comparing section 10, the control section 21d outputs a disabling signal to the switch 22. When the disabling signal is fed from the control section 21d, the switch 22 opens (OFF). The switch 22 is thus brought into a non-conducting (OFF) state in accordance with the control signal from the control section 21d. Thus, the input signal received by the waveform shaping section 8d is supplied through the EMI filter 23 to the output terminal 20.

Figure 9:
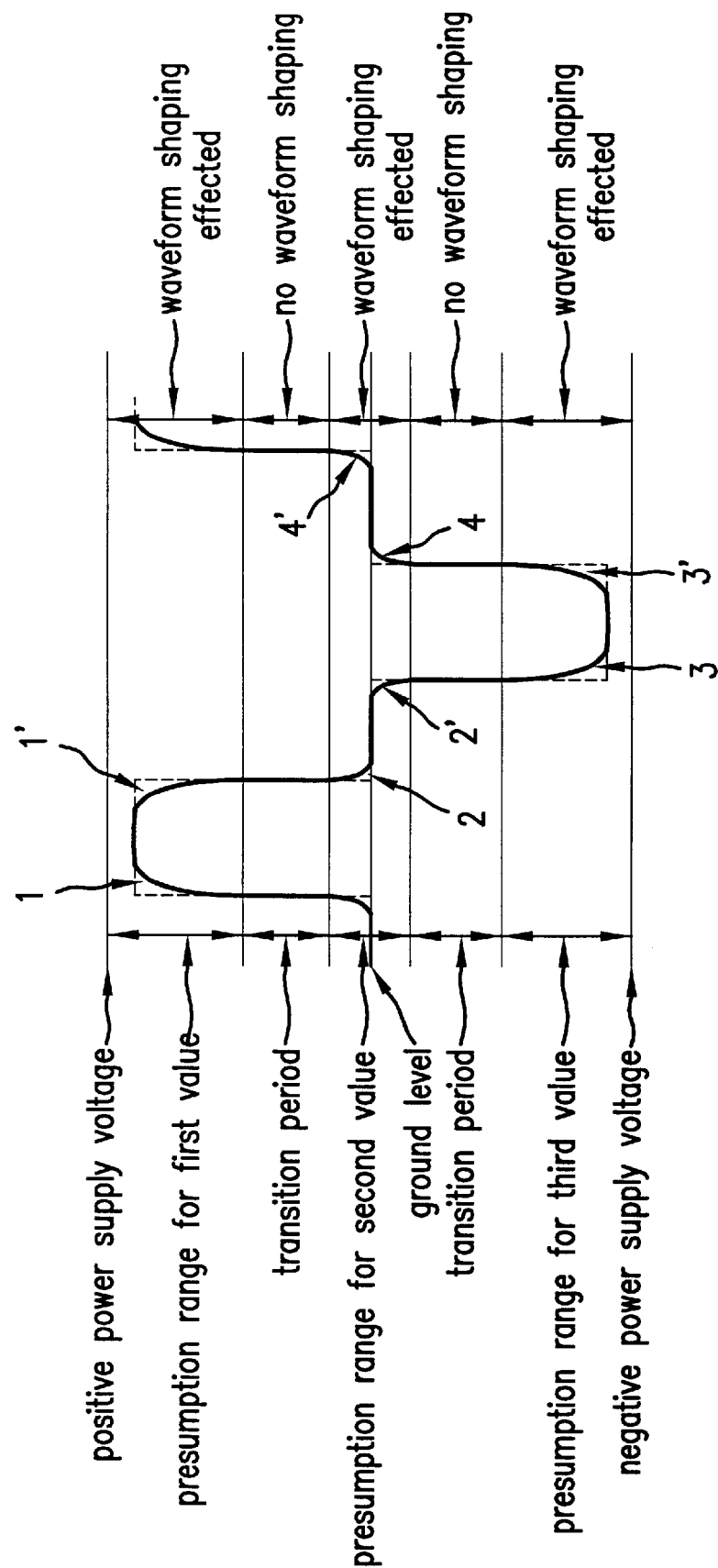
FIG. 9 is an illustration for explaining the operation of the fifth preferred embodiment of the present invention.
Figure 10A:
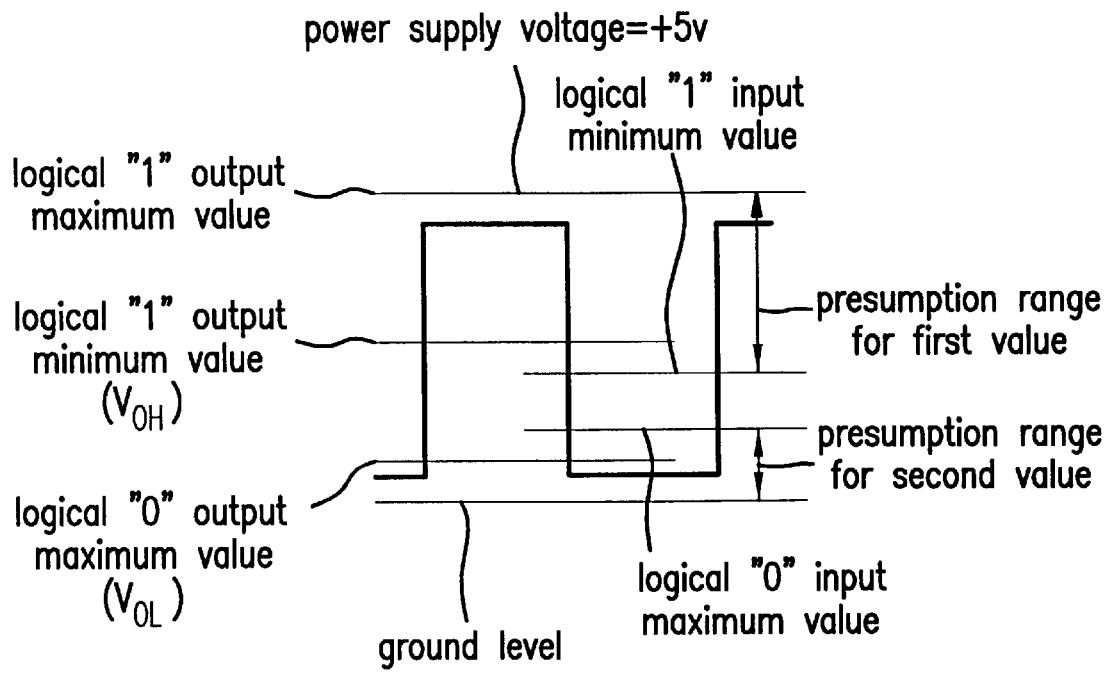
FIG. 10 are illustrations showing basic waveforms of a binary signal processed in a common digital IC.
Figure 10B:
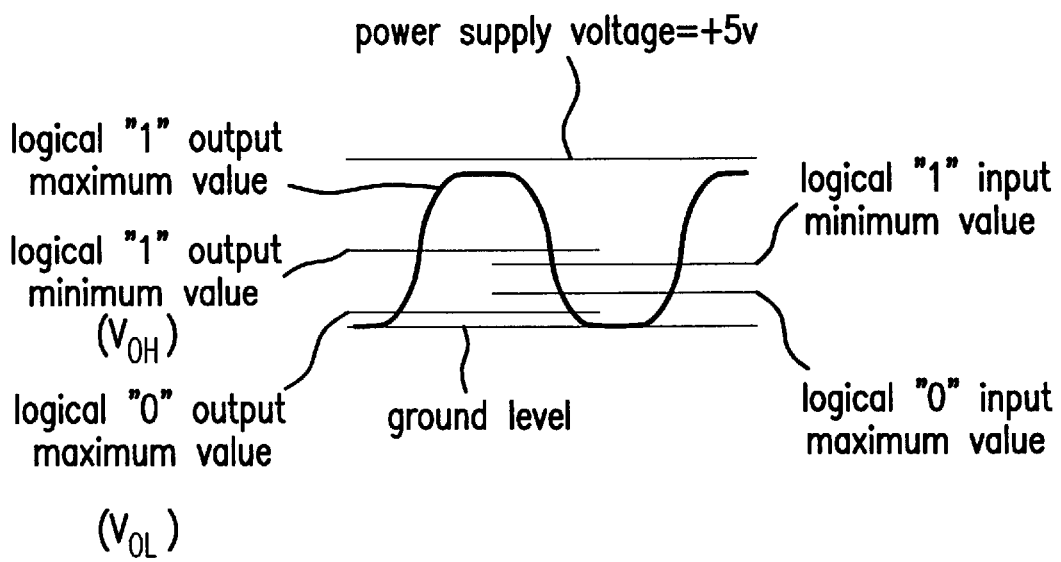

As shown at ① in FIG. 9, within the presumption range for the logical "1" or the first value, the waveform of the output signal supplied from the output terminal 20 is rendered gentle due to the effect of the EMI filter 23. Thus, the harmonic components thereof are eliminated, so that the undesirable radiations are reduced. As long as the signal is present within the presumption range for the first value, the comparing section 10 keeps detecting the fact that the signal is still within the presumption range for the first value. Thus, the switch 22 maintains the opened state.

Next, attention is paid to the case where the input signal changes from the logical "1" to the logical "0". When the pulse wave falls, the switch 22 is still in the opened state, so that the waveform supplied from the output terminal 20 changes gently due to the effect by of the EMI filter 23 (① of FIG. 9). When the input signal further drops, the comparing section 10 detects the fact that the input signal is out of the first presumption range, and renders its output valid.

In response to the output of the comparing section 10, the control section 21d outputs an enabling signal to the switch 22. When the enabling signal is fed from the control section 21d, the switch 22 closes (ON). Specifically, the input signal received by the waveform shaping section 8d is supplied through the switch 22 to the output terminal 20. Due to the fact that the input signal passes through the switch 22, the output signal maintains the abrupt change in waveform during the transition period of the input signal from the presumption range for the first value to the presumption range for the second value.

When the input signal further changes and represents a value within the second presumption range, the comparing section 9 renders its output invalid. In response to this comparison result, the control section 21d outputs a disabling signal to the switch 22. When the disabling signal is fed from the control section 21d, the switch 22 opens (OFF). As a result, the input signal is supplied through the EMI filter 23 to the output terminal 20.

As shown at ② in FIG. 9, the change in waveform of the signal outputted from the output terminal 20 is gentle within the second presumption range due to the effect of the EMI filter 23. Thus, the harmonic components are eliminated from the output signal, so that the undesirable radiations are reduced.

Next, attention is paid to the case where the input signal changes from the logical "0" to the logical "−1". In this case, at the portion where the pulse wave starts falling the waveform of the signal outputted from the output terminal 20 is gentle by the effect of the EMI filter 23 (②′ of FIG. 9).

When the value of the input signal further drops, the comparing section 9 detects the fact that the value of the input signal is out of the second presumption range. As a result, the comparing section 9 renders its output valid. When the output of the comparing section 9 is made valid, the control section 21d outputs an enabling signal to the switch 22. When the enabling signal is fed from the control section 21d, the switch 22 closes (ON). Specifically, the input signal is supplied through the switch 22 to the output terminal 20. As a result, during the time period when the input signal shifts from the second presumption range to the third presumption range, the output signal maintains its abrupt change in waveform.

When the value of the input signal further drops, the comparing section 42d detects the fact that the input signal falls within the third presumption range. The comparing section 42d, then, renders its output invalid. When the output of the comparing section 42d is rendered invalid, the control section 21d outputs a disabling signal to the switch 22. When the disabling signal is fed from the control section 21d, the switch 22 opens (OFF). As a result, the input signal is supplied through the EMI filter 23 to the output terminal 20.

As shown at ③ in FIG. 9, since the signal passes through the EMI filter 23 in the third presumption range, the waveform of the signal outputted from the output terminal 20 is gentle. Thus, the harmonic components are eliminated, so that the undesirable radiations are reduced.

Next, attention is paid to the case where the input signal changes from the logical "−1" to the logical "0". In the rising portion of the pulse wave, the waveform appearing at the output terminal 20 is gentle also by the effect of the EMI filter 23 (③′ of FIG. 9).

When the input signal goes up further, it is detected by the comparing section 42d that the input signal is out of the third presumption range. The comparing section 42d then renders its output valid. When the output of the comparing section 42d is rendered valid, the control section 21d outputs an enabling signal to the switch 22. When the enabling signal is fed from the control section 21d, the switch 22 closes (ON). The input signal is then supplied through the switch 22 to the output terminal 20. Thus, during the time period when the input signal shifts from the third presumption range to the presumption range for the second value, the waveform of the output signal maintains its abrupt change.

When the input signal goes up further, it is detected by the comparing section 9 that the input signal is within the second presumption range. The comparing section 9 then renders its output invalid. In response to the invalidated output of the comparing section 9, the control section 21d outputs a disabling signal to the switch 22. When the disabling signal is fed from the control section 21d, the switch 22 opens (OFF). As a result, the input signal is supplied through the EMI filter 23 to the output terminal 20.

As shown at ④ in FIG. 9, the waveform of the signal supplied through the EMI filter 23 to the output terminal 20 changes gently in the second presumption range. Thus, the harmonic components are eliminated, so that the undesirable radiations are reduced.

Next, attention will be paid again to the case where the signal from the logic circuit section 38d changes from the logical "0" to the logical "1". In this case, similarly to the case described before, the signal supplied from the output terminal 20 exhibits a gentle change in waveform at the beginning of the rising portion of the pulse wave ((4)' of FIG. 9).

As described above, in each interval between the presumption rages the abrupt change in waveform is maintained, whereas in each presumption range the gently changing waveform is formed and the harmonic components are eliminated. Consequently, instants of change of signal in the digital signal can accurately be transmitted and the undesirable radiations can be reduced.

In the embodiments described above, as examples of the binary values, the logical "1" output minimum value and the logical "0" output maximum value of the TTL-IC standard were taken. However, in the case where the present invention is applied to an input section of a receiving side in order to correctly discriminate, upon receiving a signal, its binary values, these binary values may be logical "1" input minimum value and the logical "0" input maximum value of the input standard.

More specifically, in the case of transmitting information by means of the binary values "0" and "1", at the input section of the digital circuit, the rising and the falling signal between the logical "1" input minimum value and the logical "0" input maximum value is so steep that it can be approximated by a vertical line. On the other hand, the signal exhibits a gentle change in waveform between the logical "1" input minimum value and the logical "1" input maximum value and also between the logical "0" input maximum value and the logical "0" input minimum value. Thus, the harmonic components are eliminated or reduced, so that the undesirable radiations are reduced.

The values used in the description of the embodiments in association with the TTL-IC are only examples and may therefore take other values for the CMOS-IC for example. Furthermore, not only when these values represent voltages but also when they represent currents, it is possible to attain a good result by means of similar construction and operation. Thus, the digital circuit according to the present invention is not restricted to a logic circuit but can be applied to various digital circuits which use a binary or a multilevel signal.

Even when the waveform shaping is performed in any one of the presumption range for the first value, the presumption range for the second value and the presumption range for the third value, the effect of reduction of the undesirable radiations can be obtained.

It should be understood that the way of shaping the waveform so that the harmonic components are eliminated in the presumption range for each value is not restricted to those in the embodiments described herein but includes other variations which can easily be realized by those skilled in the art.

It should further be understood that the way of shaping the waveform so that the amplitude is limited in the presumption range for each value is not restricted to those in the embodiments described herein but includes other variations which can easily be realized by those skilled in the art.

It should further be understood that the means for outputting the signal without the waveform shaping in each transition period between the binary values or between the multilevel values, i.e., the switches in the embodiments may include any variations which can easily be realized by those skilled in the art.

The above embodiments were described on the assumption that the waveform shaping section is provided on the output side of the logic circuit section 3 integrally therewith or separately therefrom. However, the waveform shaping section can be merged into the logic circuit section in such a manner that it shares constituent elements of the logic circuit section. When it is merged, apart from the reduction of undesirable radiations, further advantages that the number of components is reduced and the reliability is enhanced can be expected.

It may be thinkable that a Schmidt trigger, i.e., a circuit having a hysteresis characteristic is incorporated as an input part of the waveform shaping section. When a dull input signal is received, particularly when an input signal which is dull in its transition period between the binary value or between the multilevel values is received, the signal can be shaped to have a steep change of waveform in the transition period between the binary values or the multilevel values and also a gentle change of waveform in other presumption ranges can be realized.

In the above embodiments, the description was made on the assumption that the waveform shaping section 8 is provided on the output side of the logic circuit section 3 integrally therewith. However, the waveform shaping section 8 can be provided in an input stage of the logic circuit section 3. With such construction, the measures against the undesirable radiations can be taken in the input stage. Thus, instants of signal changes can accurately transferred in the transmission and reception of a digital signal, and the undesirable radiations can be reduced.

The waveform shaping section 8 may be provided in both the input and output stages of the logic circuit section 3. With such arrangement, the measures against the undesirable radiations can be taken both in the input stage and the output stage of the logic circuit section 3. Thus, instants of signal changes can accurately transferred in the transmission and reception of a digital signal, and the undesirable radiations can be reduced.

In the above embodiments, the description was made on the assumption that the waveform shaping section is provided on the output side of the logic circuit section 3 integrally therewith. However, the waveform shaping section 8 may be a digital circuit for the purpose of taking the countermeasures to the undesirable radiations (undesirable radiation countermeasure circuit) in the form of an external component.

As described above in detail with reference to the various embodiments, the digital circuit according to the present invention can maintain a steep change in waveform in each transition period between the binary values or the multilevel values and can realize a gentle change in waveform in other presumption ranges, whereby an accurate transmission of instants of change of the signal as well as an elimination or a reduction of the harmonic components or a reduction of magnitude (or level) of the harmonic components, i.e., a reduction of the undesirable radiations can be realized. It is also possible to reduce the overshoots and undershoots. As a result, the operation of the circuit is rendered stable.

In case the comparing sections directly activate the time constant sections, the control section 11 and the control section 12 can be omitted.

When the predetermined time constant can be obtained by output resistances of the logical 1 output section 6 and the logical 0 output section 7 the resistor 19 can be omitted.

Industrial Applicability

As described above in detail, according to the present invention it is possible to accurately transmit instants of change of the signal while reducing the undesirable radiations in a digital circuit for transmitting information by means of binary values or multilevel values, so that the digital circuit according to the present invention is useful as a circuit for signal processing or signal transmission and is suitable for use in various circuits.

What is claimed is:

1. A digital circuit for transmitting information by means of a multilevel signal having at least two values comprising:
   a waveform shaping section to which at least first and second presumption values for defining at least first and second presumption ranges based on said at least two values, respectively, are set, said waveform shaping section performing a waveform shaping for eliminating higher harmonic components of a waveform in each of the presumption ranges and performing a waveform shaping for maintaining abrupt changes of the waveform in a transition period from one of the presumption ranges to another;
   said waveform shaping section including:
      a comparing section for comparing a value of an input signal with the presumption values defining said at least first and second presumption ranges; and
      a time constant section for changing a time constant defining a changing rate of the waveform of said input signal when it is detected based on a comparison result of said comparing section that the value of said input signal is within any one of the presumption ranges.

2. A digital circuit for transmitting information by means of a multilevel signal having at least two values comprising:
   a waveform shaping section to which at least first and second presumption values for defining at least first and second presumption ranges based on said at least two values, respectively, are set, said waveform shaping section performing a waveform shaping for reducing a magnitude of higher harmonic components of a waveform in each of the presumption ranges and performing a waveform shaping for maintaining abrupt changes of the waveform in a transition period from one of the presumption ranges to another;
   said waveform shaping section including:
      a comparing section for comparing a value of an input signal with the presumption values defining said at least first and second presumption ranges; and
      a time constant section for changing a time constant defining a changing rate of the waveform of said input signal when it is detected based on a comparison result of said comparing section that the value of said input signal is within any one of the presumption ranges.

3. A digital circuit for transmitting information by means of a multilevel signal having at least two values comprising:
   a waveform shaping section to which at least first and second presumption values for defining at least first and second presumption ranges based on said at least two values, respectively, are set, said waveform shaping section performing a waveform shaping for eliminating higher harmonic components of a waveform in each of the presumption ranges and performing a waveform shaping for maintaining abrupt changes of the waveform in a transition period from one from one of the presumption ranges to another;
   said waveform shaping section including:
      a comparing section for comparing a value of an input signal with the presumption values defining said at least first and second presumption ranges; an electromagnetic interference elimination filter for passing said input signal therethrough; and
      a switch for causing said input signal to be supplied to said electromagnetic interference elimination filter in accordance with a comparison result of said comparing section.

4. A digital circuit for transmitting information by means of a multilevel signal having at least two values comprising:
   a waveform shaping section to which at least first and second presumption values for defining at least first and second presumption ranges based on said at least two values, respectively, are set, said waveform shaping section performing a waveform shaping for reducing a magnitude of higher harmonic components of a waveform in each of the presumption ranges and performing a waveform shaping for maintaining abrupt changes of the waveform in a transition period from one of the presumption ranges to another;
   said waveform shaping section including:
      a comparing section for comparing a value of an input signal with the presumption values defining said at least first and second presumption ranges;
      an electromagnetic interference elimination filter for passing said input signal therethrough; and
      a switch for causing said input signal to be supplied to said electromagnetic interference elimination filter in accordance with a comparison result of said comparing section.

5. A digital circuit for transmitting information by means of a multilevel signal having at least two values comprising:
   a waveform shaping section to which at least first and second presumption values for defining at least first and second presumption ranges based on said at least two values, respectively, are set;
   said waveform shaping section including a zener diode and a resistor serially connected to each other for performing a waveform shaping to reduce a magnitude of higher harmonic components of a waveform in each of the presumption ranges and to maintain abrupt changes of the waveform in a transition period from one of the presumption ranges to another.

6. A digital circuit for transmitting information by means of a multilevel signal having at least two values comprising:
   a waveform shaping section to which at least first and second presumption values for defining at least first and second presumption ranges based on said at least two values, respectively, are set;
   said waveform shaping section including a series arrangement of a resistor and two zener diodes connected to each other in a reversed relation for performing a waveform shaping to reduce a magnitude of higher harmonic components of a waveform in each of the presumption ranges and to maintain abrupt changes of the waveform in a transition period from one of the presumption ranges to another.

* * * * *

UNITED STATES PATENT AND TRADEMARK OFFICE
CERTIFICATE OF CORRECTION

PATENT NO. : 6,388,462 B1
DATED : May 14, 2002
INVENTOR(S) : Tadayuki Tsuzura

It is certified that error appears in the above-identified patent and that said Letters Patent is hereby corrected as shown below:

<u>Title page,</u>
Please correct the filing data from:
"[22]  PCT Filed:   Jul. 21, 1998" to
-- [22]  PCT Filed:   Jul. 2, 1998 --

Signed and Sealed this

Twenty-second Day of October, 2002

*Attest:*

JAMES E. ROGAN
*Attesting Officer*   *Director of the United States Patent and Trademark Office*